UNITED STATES PATENT OFFICE 3,636,135
Patented Jan. 18, 1972

3,636,135
POLYAMIDES ADMIXED WITH POLY-ETHERESTERAMIDES
John David Garforth, Manchester, England, assignor to Imperial Chemical Industries Limited, London, England
No Drawing. Filed Aug. 22, 1969, Ser. No. 852,507
Claims priority, application Great Britain, Sept. 5, 1968, 42,215/68
Int. Cl. C08g 41/04
U.S. Cl. 260—857
10 Claims

ABSTRACT OF THE DISCLOSURE

Polyamide compositions suitable for the manufacture of shaped articles, especially fibres, having anti-static and soil-resistant properties are uniform mixtures of a synthetic linear polyamide and a polyetheresteramide obtained by condensing (a) an aliphatic dicarboxylic acid, and (b) a hydroxypolyoxyalklene compound, and either (c) an aliphatic or cycloaliphatic amino acid or lactam, or (d) an aliphatic or cycloaliphatic diamine, or both (c) and (d). The most suitable polyetheresteramides are those in which less than 20% by weight of the repeat units in the polyamide segments thereof are identical with the repeat units of the polyamide. The soil-resistant properties of fibres are best developed by a scouring treatment.

---

This invention relates to polyamide compositions and particularly to polyamide compositions which are resistant to static electrification. More particularly the invention relates to shaped articles of the polyamide compositions, especially fibrous shaped articles, which are resistant to static electrification and to soiling.

It has already been proposed to manufacture a synthetic polyamide fibre with antistatic properties having uniformly blended therein a proportion of a poly(alkylene ether) glycol, and to achieve an improved visual anti-soiling effect by scouring the fibre.

It has also been proposed in British patent specification No. 1,124,271 to treat shaped articles composed of synthetic polymeric material, including polyamide synthetic polymeric material, by applying to or depositing upon the said articles a condensation product obtained by reacting together (a) an aliphatic dicarboxylic acid, (b) an hydroxypolyoxyalkylene compound, and either (c) an aliphatic or cycloaliphatic amino acid or lactam, or (d) an aliphatic or cycloaliphatic diamine, or both (c) and (d), in order to improve resistance to static electrification and reduce the tendency to soiling.

We have now found that if the condensation products, the use of which in treating shaped articles is described in British patent specification No. 1,124,271, are uniformly mixed with a synthetic linear polyamide and the resulting composition is formed into a shaped article, then, subject to the qualification of the following paragraph, the said shaped article has superior properties to similarly shaped synthetic linear polyamide articles which have been treated with the condensation products by the process of the prior specification.

The condensation products used in our polyamide compositions are polyetheresteramides containing polyether and polyamide segments, and we have found that best results are achieved in shaped articles from our compositions (as will be described hereinafter) when the repeat units in the polyamide segments of the polyetheresteramide are different from the repeat units in the polyamide. The presence of a small proportion (less than 20% by weight) of repeat units in the polyamide segments in the polyetheresteramide which are identical with repeat units in the polyamide will not, however, seriously affect the good properties of shaped articles from our polyamide compositions.

Thus our invention provides a polyamide composition comprising a synthetic linear polyamide and uniformly admixed therewith from 0.1% to 25% by weight of the said polyamide of a polyetheresteramide which is a condensation product of (a) an aliphatic dicarboxylic acid, and (b) a hydroxypolyoxyalkylene compound, and either (c) an aliphatic or cycloaliphatic amino acid or lactam, or (d) an aliphatic or cycloaliphatic diamine, or both (c) and (d), provided that less than 20% by weight of the repeat units in the polyamide segments of the said polyetheresteramide are identical with the repeat units of the said polyamide. Preferably the repeat units in the polyamide segments of the polyetheresteramide are substantially all different from the repeat units of the polyamide.

Synthetic linear polyamides include those polyamides known generically as the nylons, and especially those obtained by the polycondensation of aminocarboxylic acids or their derived lactams, or of mixtures of diamines with dicarboxylic acids. Familiar examples of such polyamides are polycaprolactam (nylon 6) and polyhexamethylene adipamide (nylon 6,6).

Of the various components from which the polyetheresteramide condensation products of our polyamides compositions are formed, particularly suitable aliphatic dicarboxylic acids are dicarboxylic acids of the formula—

in which $n$ represents zero or a positive integer from 1 to 14. Adipic acid is particularly suitable.

Particularly suitable aliphatic amino acids or lactams are ω-amino aliphatic carboxylic acids and the derived lactams. Particular compounds of this class may be represented by one of the formulae:—

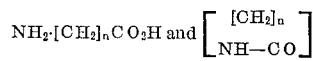

in which $n$ is a positive integer from 3 to 11.

Caprolactam is particularly suitable. Examples of cycloaliphatic amino acids include 4-aminocyclohexanecarboxylic acid and 4-aminocyclohexylacetic acid.

By a hydroxy-polyoxyalkylene compound from which the polyetheresteramide condensation products are formed we mean a compound containing at least one hydroxyl group and a plurality of divalent radicals of the formula —alkylene—O—. The alkylene groups preferably contain from two to four carbon atoms and particularly preferred are 1,2-ethylene and 1,2-propylene groups. The alkylene groups in any one compound may be the same or different. Such compounds include polyoxyalkylene glycols and especially polyoxyethylene glycols and polyoxypropylene glycols. Particularly suitable are those mixtures of polyoxyethylene glycols which have an average molecular weight of between 300 and 6,000. Also suitable are condensates of alkylene oxides with compounds containing hydrogen atoms reactive with alkylene oxides. The alkylene oxide may be ethylene oxide, propylene oxide or butylene oxide, or mixtures of such alkylene oxides may be used. Particularly suitable are alkylene oxide condensates of the following types:

(1) Alkylene oxide condensates derived from glycols including those containing more than 4 carbon atoms, for example condensates of 1,6-hexanediol with ethylene or propylene oxide, (2) Alkylene oxide condensates derived from polyols, for example glycerol, trimethylolpropane, pentaerythritol, mannitol or sorbitol, (3) Alkylene oxide condensates derived from primary amines, for example, methylamine or from polyamines, (4) Alkylene oxide condensates derived from acid amides, (5) Alkylene oxide condensates derived from di- or polycarboxylic acids, for example, succinic or adipic acids, (6) Alkylene oxide condensates derived from di- or polyhydric phenols, for example, diphenylolpropane, and (7) Polyoxyalkylene compounds containing one terminal hydroxyl group together with one primary amino group. Such compounds are described in U.S. Patent specification No. 3,110,732 and include compounds of the formula $H_2N.(CH_2.CH_2O)_xH$ in which $x$ represents a positive integer.

The aliphatic or cycloaliphatic diamines from which the polyetheresteramide condensates may be formed may be any aliphatic or cycloaliphatic diamines in which the amino groups are primary or secondary. Particularly preferred, however, are those aliphatic diamines having the formula:

$$NH_2.[CH_2]_nNH_2$$

in which $n$ represents a positive integer of from 2 to 12. Hexamethylene diamine is particularly suitable.

In forming the polyetheresteramide condensation products, instead of a single dicarboxylic acid, hydroxy-polyoxyalkylene compound, amino acid or lactam, or diamine mixtures of the said compounds may be used. Moreover, instead of the compounds themselves, amide- or ester-forming derivatives of the compounds may be used. Thus instead of the dicarboxylic acids themselves there may be used esters of the dicarboxylic acids, especially the lower alkyl esters.

The polyetheresteramide condensates are conveniently prepared by mixing the components and heating them, for example at a temperature within the range 150° to 300° C. for from 30 minutes to 12 hours. It may be desirable to carry out the condensation in an atmosphere of an inert gas such as nitrogen. It may also be desirable to incorporate antioxidants or stabilisers in the reaction mixture prior to condensation. In some cases it is preferable to incorporate a solvent or flux such as o-phenylphenol in the reaction mixture. This may subsequently be removed by distillation under reduced pressure. It is frequently advantageous to carry out the final stages of the condensation at a reduced pressure. Instead of adding any diamine separately to the reaction mixture it may be added in the form of a salt with the dicarboxylic acid.

The proportions of the components used in forming the polyetheresteramide condensates are such that the weight ratio of hydroxy-polyoxyalkylene compound compared to polyamide-forming components lies in the range 20:80 to 95:5, the preferred range being 50:50 to 90:10.

The condensates are polyetheresteramides which contain in the molecule at least one unit consisting of a plurality of radicals of the formula —alkylene—O— linked together.

The polyamide compositions of our invention are made by uniformly admixing with a synthetic linear polyamide from 0.1% to 25% by weight, calculated on the weight of the said polyamide, of a polyetheresteramide condensation product as hereinbefore defined and described. The mixing is best effected by mixing the said polyamide and the said polyetheresteramide condensation product in the solid state, heating the mixture until it is molten, preferably in the absence of air, for example in a nitrogen atmosphere, stirring the mixture until adequate blending is effected, and then allowing the mixture to solidify and breaking up the solid. The preferred proportion of polyetheresteramide condensation product is from 5% to 10% by weight of the said polyamide.

The polyamide compositions of our invention may be formed into shaped articles by any known shaping process, for example by casting, moulding or extrusion. Where the synthetic linear polyamide of the polyamide composition of our invention has a molecular weight in the fibre-forming range, the said polyamide composition may be melt spun into fibres by methods well-known to the art.

The polyamide compositions of our invention, particularly in the form of shaped articles, and especially in fibrous form, have enhanced resistance to static electrification compared with the synthetic linear polyamide in the absence of the condensation product. Synthetic linear polyamides are hydrophobic in character. It is well known that shaped articles made from hydrophobic polymeric material besides having a very limited capacity for absorbing moisture become electrified readily when subjected to friction. These properties are disadvantageous in that the electrified articles readily attract dirt and dust. Moreover film composed of hydrophobic polymeric material which has become electrified is difficult to handle in that it becomes attracted to and clings to other articles. Further, textile materials composed of hydrophobic polymeric material which are used for clothing, besides having the disadvantages of soiling readily, tend to be uncomfortable in wear owing to the limited capacity for absorbing moisture. In shaped articles made from the polyamide compositions of our invention these disadvantages are reduced or obviated.

A particular advantage of fibrous material made from the polyamide compositions of our invention is its resistance to soiling. In order to achieve the best anti-soiling effect, however, it is desirable that the fibrous material be subjected to a washing or scouring operation, or similar wet treatment. Such an operation apparently has the effect of removing a portion of the polyetheresteramide condensation product from the polyamide composition in fibrous form so creating voids within the fibrous structure. It is believed that these voids enhance the visual anti-soiling effect. It is also believed that partial breakdown of the polyetheresteramide condensation product by hydrolysis of at least some of the ester groups contained therein may assist in the removal of a portion of the condensation product. The best anti-soiling effect is not achieved, however, when the polyetheresteramide of the polyamide composition has a significant proportion of the repeat units of the polyamide segments thereof identical with the repeat units of the polyamide of the polyamide composition, and polyamide compositions in which the proportion of polyamide repeat units in the polyetheresteramide which are identical with the repeat units in the polyamide exceeds 20% by weight are outside the scope of our invention. It is believed that when the said repeat units are identical, co-crystallisation of the polyesteramide with the polyamide can occur, and in these circumstances the polyesteramide is difficult to remove in the washing or scouring operation so that the voids which are believed to give rise to the anti-soiling effect are not created. The washing or scouring operation may take place incidentally in the normal processing of the fibrous material, for example it may be a scouring operation prior to dyeing. A normal routine washing of a textile article made from the fibrous material will also achieve the enhanced anti-soiling effect. Alternatively a special operation may be employed.

As an illustration of the different effects achieved (a) when the repeat units in the polyamide segments of the polyetheresteramide are identical with the repeat units of the polyamide, and (b) when the repeat units are different, one may consider a condensation product of a polyethylene glycol and caprolactam with a minor proportion of adipic acid such as is described in Example 1. In the polyamide segments of such a condensation product the repeat units may be represented by the formula $—NH[CH_2]_5CO—$. These are identical with the repeat units of polycaprolactam (nylon 6), and a polyamide composition comprising a uniform mixture of such a condensation product and nylon 6 would be outside the scope of our invention and would not have the very good anti-soiling properties of the compositions of our invention (this is illustrated in Example 6). On the other hand such a condensation product gives very good anti-soiling effects in polyamide compositions of our invention in which the polyamide is polyhexamethylene adipamide (nylon 6,6), the repeat units of which are

—NH[CH$_2$]$_6$NHCO[CH$_2$]$_4$CO— and different from the polyamide repeat units of the condensation product (this is illustrated in Examples 2, 3 and 4). The introduction into the mixture of components giving rise to the condensation product on heating of a minor proportion of hexamethylene diamine and an equivalent proportion of adipic acid, so giving rise to a proportion of polyamide repeat units in the condensation product identical with those of nylon 6,6 would be acceptable, and the polyamide composition comprising the condensation product and nylon 6,6 would be within the scope of our invention, provided the proportion of nylon 6,6 repeat units in the condensation product does not exceed 20% by weight of the total polyamide repeat units.

Compared with a synthetic polyamide fibre having uniformly blended therein a proportion of a poly(alkylene ether) glycol, which has been scoured to achieve an improved visual anti-soiling effect, scoured fibres made from polyamide compositions of our invention have increased opacity and an increased resistance to soiling (this is illustrated in Example 5).

When polyamide textile material has been treated according to the process of British patent specification No. 1,124,271 with condensation products similar to the polyetheresteramides of the polyamide compositions of our invention, the condensation product is not uniformly admixed with the polyamide but forms a coating on the surface of the textile material. There is no condensation product within the fibrous structure, so that when the treated textile material is scoured no voids are formed within the fibrous structure. Compared with these treated polyamide textile materials, textile materials made from polyamide compositions of our invention have, after scouring, increased opacity and an increased resistance to soiling.

Particularly suitable polyamide compositions of our invention are uniform mixtures of polyhexamethylene adipamide with a condensation product of adipic acid, caprolactam and a polyoxyethylene glycol with an average molecular weight between 300 and 6000. Such polyamide compositions may be melt spun into fibres having a very good resistance to discolouration by soiling.

The invention is illustrated but not limited by the following examples in which the parts and percentages are by weight.

EXAMPLE 1

750 parts of a polyethylene glycol of average molecular weight 1540, 71.4 parts of adipic acid and 750 parts of caprolactam are placed in a 3 litre, 4 necked flask fitted with stirrer, thermometer, nitrogen inlet and distillation head. The system is evacuated and nitrogen introduced until all the air has been displaced from the system. The reaction mixture is then heated to 235° C. under nitrogen and stirred for 4 hours at 235–245° C. distilling out water (16 parts). The pressure is then reduced to 20 mm. Hg and the reaction mixture is stirred at this pressure at 235–245° C. for 1 hour. 70 parts distillate are collected. The internal pressure is returned to atmospheric pressure with nitrogen and when the mixture has cooled to 200° C. it is poured out onto an aluminum tray to cool quickly. The white waxy product is chipped up into ⅛″–¼″ cubes.

EXAMPLE 2

98 parts of polyhexamethylene adipamide (nylon 6,6) in the form of chip and 2 parts of the copolymer produced in Example 1 are charged to a reaction tube. The system is evacuated and nitrogen is introduced to displace all the air from the system. The system is then heated at 270° C. for ½ hour and the molten mixture blended using a helical stirrer. The product was chipped and melt spun. The fibre properties are given in Table 1. The test for Soil Additional Density (SAD) is described in the following paragraph.

The fibre produced was wound under minimum tension round a square metal frame until an opaque pad was produced. This was then scoured by immersing in a solution containing 1.25 gms. of trisodium phosphate and 1 gm. of sodium oleyl p-anisidine sulphonate per litre of water using a liquor ratio of 10:1 and raising the bath temperature to 90° C. during ½ hour. The bath was then maintained at 90–95° C. for 1 hour with gentle circulation. The samples were removed and rinsed well with water at 60° C. and then dried in an oven at 100° C. The reflectance value of the samples was measured on a Colormaster Colorimeter before soiling by tumbling for 20 minutes with soiled felt cubes. The loose soil was removed by vacuum and the reflectance value was again measured. From these figures SAD values were calculated.

SAD (soil additional density) = $\log_{10} R_0/R_1$
$R_0$ = initial reflectance
$R_1$ = reflectance after soiling

EXAMPLE 3

95 parts nylon 6,6 chip and 5 parts of the copolymer produced in Example 1 are melt blended as in Example 2. The fibre properties are given in Table 1.

EXAMPLE 4

90 parts nylon 6,6 chip and 10 parts of the copolymer of Example 1 are melt blended as in Example 2. The fibre properties are given in Table 1.

EXAMPLE 5

This is a comparative example showing the effect of blending a polyamide with a poly(alkylene ether)glycol.

95 parts of nylon 6,6 are melt blended with 5 parts of a condensate of 1 mole of nonyl phenol with 30 mole of ethylene oxide, as in Example 2. The fibre properties are given in Table 1.

EXAMPLE 6

This is a comparative example showing the effect of having identical repeat units in the polyamide segments of the polyetheresteramide and in the polyamide.

92.5 parts of nylon 6 chip (polycaprolactam) and 7.5 parts of the condensation product of Example 1 are charged to a reaction tube. The air in the system is displaced with nitrogen by evacuating the system and introducing nitrogen.

The polymers are then blended as in Example 2, chipped, and melt-spun. The fibre properties are given in Table I. The fibres have poor soil-hiding properties.

EXAMPLE 7

600 parts of a polyethylene glycol of average molecular weight 1540, 78.8 parts of sebacic acid, and 190 parts of nylon 6.10 salt (hexamethylenediamine sebacate) are charged to a flask fitted with stirrer, thermometer, nitrogen inlet, and distillation head. The system is evacuated and nitrogen introduced to displace all the air from the system. The reaction mixture is then raised to a temperature of 240° C. over a period of one hour, distilling off water. The mixture is maintained at this temperature for a further three hours, distillation being continued, before being poured into an aluminium tray to cool. The copolymer is chipped up into approximately ¼ cubes.

7½ parts of the above copolymer are blended with 92½ parts of nylon 6,6 and melt spun as in Example 2.

The resultant fibres have good antisoil properties as shown in Table I.

EXAMPLE 8

600 parts of a polyethylene glycol of average molecular weight 1540, and 264 parts of dibutyl oxalate are charged to a flask fitted as in Example 7. The temperature is raised to 245° C. over a period of one hour distilling off butanol. 177.5 parts of a 60% methanolic hexamethylene diamine solution are then added and reaction continued at 245° C., with distillation, for a further two hours. The polymer was poured into an aluminum tray and chipped.

7½ parts of the copolymer thus produced was blended with 92½ parts nylon 6,6 as in Example 2, chipped, and melt spun. The resultant fibres had excellent soil hiding characteristics as shown in Table I.

TABLE I.—FIBRE PROPERTIES

| Sample | Specific resistance | S.A.D.* | S.A.D.* relative to control |
|---|---|---|---|
| Control (nylon 6,6) | $1.8 \times 10^{10}$ | 0.555 | 100 |
| Example 2 | $1.9 \times 10^{9}$ | 0.426 | 76.76 |
| Example 3 | $9.3 \times 10^{8}$ | 0.396 | 71.35 |
| Example 4 | $3.1 \times 10^{8}$ | 0.316 | 56.96 |
| Example 5 | $3.1 \times 10^{8}$ | 0.498 | 89.69 |
| Example 6 | $6.3 \times 10^{7}$ | 0.465 | 83.79 |
| Example 7 | $4.2 \times 10^{8}$ | 0.422 | 76.03 |
| Example 8 | $5.3 \times 10^{7}$ | 0.361 | 65.04 |

*S.A.D.=Soil additional density.

I claim:

1. A polyamide composition comprising a synthetic linear polyamide and uniformly admixed therewith from 0.1% to 25% by weight of the said polyamide of a polyetheresteramide which is a condensation product of (a) an aliphatic dicarboxylic acid of the formula $$HO_2C \cdot [CH_2]_n CO_2H$$

in which $n$ represents zero or a positive integer from 1 to 14 and (b) a hydroxypolyoxyalkylene compound, and either (c) an aliphatic or cycloaliphatic amino acid of the formula $$NH_2 \cdot [CH_2]_n CO_2H$$

or lactam of the formula $$\left[ \begin{array}{c} [CH_2]_n \\ NH-CO \end{array} \right]$$

in which $n$ is a positive integer of from 3 to 11, or (d), an aliphatic or cycloaliphatic diamine, or both (c) and (d), provided that less than 20% by weight of the repeat units in the polyamide segments of the said polyetheresteramide are identical with the repeat units of the said polyamide, the weight ratio of hydroxy polyoxyalkylene compound (b) compared to polyamide-forming components lying in the range 20:80 to 95:5.

2. The composition of claim 1 in which the repeat units in the polyamide segments of the polyetheresteramide are substantially all different from the repeat units of the polyamide.

3. The composition of claim 1 in which the hydroxypolyoxyalkylene compound from which the polyetheresteramide is formed is a polyoxyalkylene glycol.

4. The composition of claim 1 in which the hydroxypolyoxyalkylene compound from which the polyetheresteramide is formed is a condensation product of ethylene oxide, propylene oxide or butylene oxide with a compound containing a hydrogen atom reactive with the said alkylene oxide.

5. The composition of claim 2 which comprises a uniform mixture of polyhexamethylene adipamide with a condensation product of adipic acid, caprolactam and a polyoxyethylene glycol with an average molecular weight between 300 and 6000.

6. The composition of claim 1 in the form of a shaped article.

7. The composition of claim 6 in fibrous form.

8. A process for the manufacture of polyamide compositions as defined in claim 1 which comprises mixing in the solid state a synthetic linear polyamide and from 0.1% to 25% by weight, calculated on the weight of the said polyamide, of a polyetheresteramide condensation product as defined in claim 1, heating the mixture until it is molten, stirring the molten mixture until uniform blending is effected, and allowing the blend to solidify on cooling.

9. The process of claim 8 in which the mixture is heated in a nitrogen atmosphere.

10. A process for the manufacture of synthetic linear polyamide fibres resistant to discolouration by soiling which comprises melt spinning a polyamide composition as claimed in claim 1 into fibres and subjecting the fibres to a washing or scouring operation.

References Cited

FOREIGN PATENTS

| 1,124,271 | 8/1968 | Great Britain. |
| 1,469,254 | 2/1967 | France. |
| 6708693 | 1/1968 | Netherlands. |

PAUL LIEBERMAN, Primary Examiner

U.S. Cl. X.R.

260—75 R, 78 A, 78 R, 860